(12) United States Patent
Urashima (10) Patent No.: US 11,640,712 B2
(45) Date of Patent: May 2, 2023

(54) INFORMATION PROCESSING APPARATUS, VIDEO IMAGE SUMMARIZATION METHOD, AND STORAGE MEDIUM

(71) Applicant: CANON KABUSHIKI KAISHA, Tokyo (JP)

(72) Inventor: Hiroki Urashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/063,219

(22) Filed: Oct. 5, 2020

(65) Prior Publication Data

US 2021/0103737 A1 Apr. 8, 2021

(30) Foreign Application Priority Data

Oct. 7, 2019 (JP) .............................. JP2019-184778

(51) Int. Cl.
*G06V 20/40* (2022.01)

(52) U.S. Cl.
CPC .............. *G06V 20/47* (2022.01); *G06V 20/41* (2022.01); *G06V 20/44* (2022.01)

(58) Field of Classification Search
CPC ........... G06K 9/00751; G06K 9/00718; G06K 2009/00738; G06K 9/6201; G06K 9/4671; G06K 9/00771; G06V 20/47; G06V 20/41; G06V 20/44; G06V 10/462; G06V 20/52
USPC ....................................................... 382/103
See application file for complete search history.

(56) References Cited

U.S. PATENT DOCUMENTS

| | | | | |
|---|---|---|---|---|
| 2016/0117827 | A1* | 4/2016 | Bae | G06V 20/52 382/103 |
| 2017/0323376 | A1* | 11/2017 | Glaser | G06Q 20/203 |
| 2019/0354765 | A1* | 11/2019 | Chan | H04N 21/21805 |
| 2021/0012632 | A1* | 1/2021 | Miyano | G08B 13/196 |

FOREIGN PATENT DOCUMENTS

| | | | |
|---|---|---|---|
| JP | 5355422 | B2 | 11/2013 |
| JP | 5432677 | B2 | 3/2014 |

OTHER PUBLICATIONS

Jian Sun, et al., Background Cut, ECCV 2006, Part II, LNCS 3952, 2006, pp. 628-641.

\* cited by examiner

*Primary Examiner* — Amandeep Saini
(74) *Attorney, Agent, or Firm* — Canon U.S.A., Inc. IP Division (57) ABSTRACT

Visibility of a summary video image is improved. An information processing apparatus generates a summary video image by changing an appearance order of a target object detected from a video image, the information processing apparatus including an identification unit configured to identify an identical target object based on data on a plurality of target objects detected from a video image, a determination unit configured to determine an arrangement of movement paths of two or more target objects identified as an identical target object by the identification unit such that the movement paths do not overlap in a time direction, and a generation unit configured to generate the summary video image of the video image based on the arrangement determined by the determination unit.

10 Claims, 12 Drawing Sheets

TARGET OBJECT INFORMATION TABLE

|  | IDENTIFIER (701) | START TIME (702) | MOVEMENT PATH (703) |
|---|---|---|---|
| 704 | ID_001 | 0 | B1 |
| 705 | ID_002 | 0 | B2 |
| 706 | ID_003 | 90 | B3 |
| 707 | ID_004 | 110 | B4 |
| 708 | ID_005 | 140 | B5 |

MOVEMENT PATH TABLE

|  | TIME (801) | CENTER COORDINATES (802) | RADIUS (803) | PIXEL MASK (804) |
|---|---|---|---|---|
| 805 | 0 | (x0, y0) | r0 | M0 |
| 806 | 1 | (x1, y1) | r1 | M1 |
| 807 | 2 | (x2, y2) | r2 | M2 |
|  | ... | ... | ... | ... |
| 808 | 40 | (x40, y40) | r40 | M40 |

TARGET OBJECT SET INFORMATION TABLE

| SET NUMBER | TARGET OBJECT IDENTIFIER | RELATIVE START TIME |
|---|---|---|
| 1 | ID_002 | 0 |
| 1 | ID_004 | 50 |
| 2 | ID_003 | 40 |
| 2 | ID_005 | 0 |

FIG.6

TARGET OBJECT START TIME TABLE

| TARGET OBJECT IDENTIFIER | START TIME IN SUMMARY VIDEO IMAGE |
|---|---|
| ID_001 | 0 |
| ID_002 | 0 |
| ID_003 | 60 |
| ID_004 | 50 |
| ID_005 | 20 |

INFORMATION PROCESSING APPARATUS, VIDEO IMAGE SUMMARIZATION METHOD, AND STORAGE MEDIUM

BACKGROUND OF THE INVENTION

Field of the Invention

The present disclosure relates to information processing apparatuses, video image summarization methods, and storage media.

Description of the Related Art

A purpose of acquiring video images and storing the acquired video images with monitoring cameras is to check suspicious persons and suspected persons to identify criminals. Video images acquired and stored by monitoring cameras are also used as an evidence video image of a crime. However, not many of the video images captured by monitoring cameras and stored in recording media of the monitoring cameras or in servers and the cloud provide dues to the identify of suspicious persons, and most of them are irrelevant and unnecessary video images. Thus, there is a need for a technique for promptly extracting portions that may provide clues from a significant amount of stored video images.

One of such techniques is discussed in Japanese Patent No. 5355422. Japanese Patent No. 5355422 discusses a technique for generating a summary video image. Specifically, a target object such as a person or car is extracted from a video image, and each extracted target object is individually shifted in a time direction so that the target objects do not overlap in a space direction (in the video image), whereby a user can check all the target objects in the video image in a short time. With this technique, the target objects that appear at different timings are reproduced at the same time, so that the total reproduction time is significantly reduced and a user can efficiently check monitoring video images.

Further, Japanese Patent No. 5432677 discusses the above-described technique further including grouping similar target objects into a cluster, determining a relative arrangement of each target object in the time direction for each cluster, and determining an arrangement of each cluster in the time direction. The term "cluster" refers to a person cluster or a car cluster. With this technique, target objects having a similar external feature or a similar movement feature are displayed close in time in a summary video image, so that a viewer can check the video images in a state organized for each group of similar target objects.

SUMMARY OF THE INVENTION

According to an aspect of the present disclosure, an information processing apparatus configured to generate a summary video image by changing an appearance order of a target object detected from a video image includes an identification unit configured to identify an identical target object based on data on a plurality of target objects detected from a video image, a determination unit configured to determine an arrangement of movement paths of two or more target objects identified as an identical target object by the identification unit such that the movement paths do not overlap in a time direction, and a generation unit configured to generate the summary video image of the video image based on the arrangement determined by the determination unit.

Further features of the present disclosure will become apparent from the following description of exemplary embodiments with reference to the attached drawings.

DESCRIPTION OF THE EMBODIMENTS

Various exemplary embodiments of the present disclosure will be described below with reference to the attached drawings. It should be noted that the exemplary embodiments disclosed herein are mere examples of implementations of the present disclosure and are to be modified or changed as appropriate for various conditions and a configuration of an apparatus to which the present disclosure is applied and that the present disclosure is not limited by the exemplary embodiments disclosed herein. Further, not every combination of features described in the exemplary embodiments is always essential to a technical solution of the invention.

In an exemplary embodiment of the present disclosure, an example of a system configured to generate a summary video image from a video image (recorded video image) captured by a monitoring camera will be described below. A summary video image is generated from a recorded video image so that a user can view the long recorded video image in a short time. This enables a law enforcement agency or security company to efficiently track a suspicious person captured by a monitoring camera in a short time. In video image summarization, a target object contained in a recorded video image is cut, and a summary video image is generated by shifting the reproduction position of the cut target object in a time direction, whereby the reproduction time is reduced. However, in a case where an identical target object comes to the front of the camera a plurality of times, the same person is reproduced and displayed at a plurality of positions in the same frame of the summary video image. This causes a viewer checking a suspicious person to fail to notice an action of the suspicious person. In order to overcome the above-described issue, an identical target object in a recorded video image is identified not to display the identical target object at a plurality of positions at the same time in a summary video image in an exemplary embodiment of the present disclosure. A video image includes a series of frame images. Hereinafter, a frame image will be referred to simply as "frame". A target object is a person or vehicle.

Figure 1A:
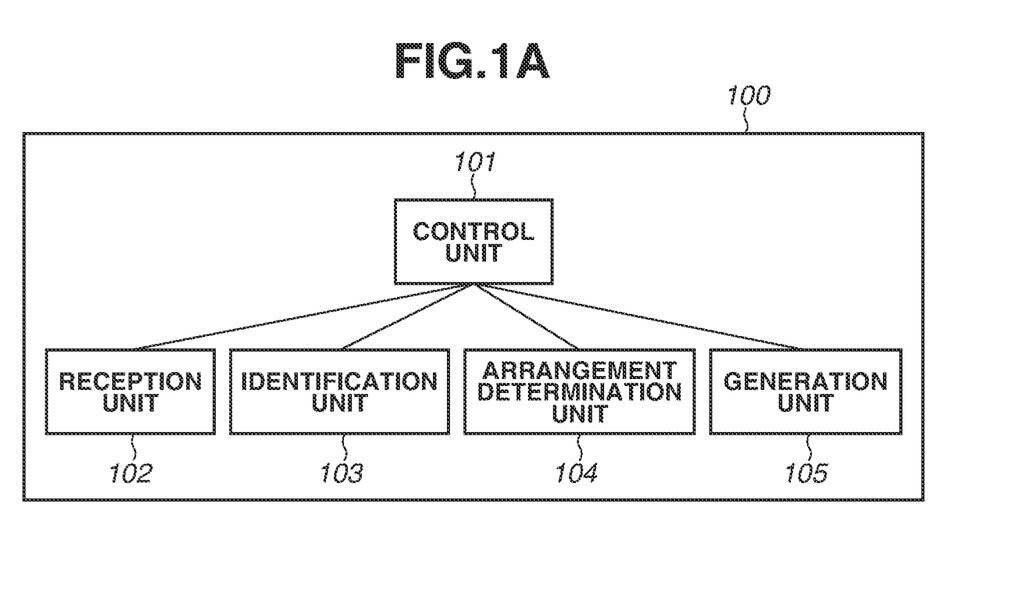
FIG. 1A is a functional block diagram illustrating a video image generation device as an example of an information processing apparatus according to an exemplary embodiment of the present disclosure.
Figure 1B:
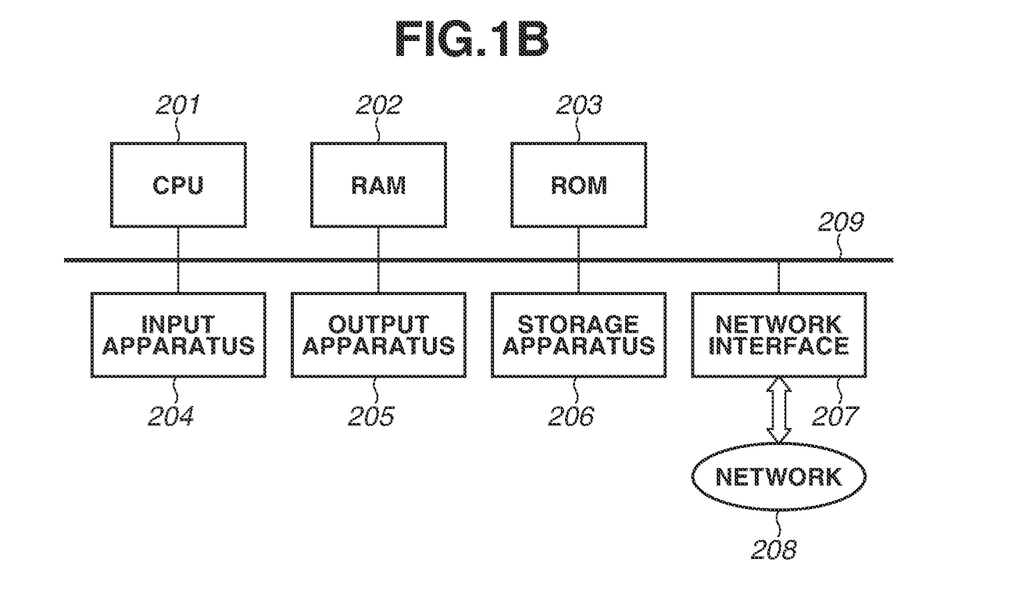
FIG. 1B illustrates a hardware configuration of the information processing apparatus.

FIG. 1A is a functional block diagram illustrating a video image generation device as an example of an information processing apparatus 100 according to an exemplary embodiment of the present disclosure. As illustrated in FIG. 1A, the information processing apparatus 100 functionally includes a control unit 101, a reception unit 102, an identification unit 103, an arrangement determination unit 104, and a generation unit 105. FIG. 1B illustrates a hardware configuration of the information processing apparatus 100. As illustrated in FIG. 1B, the information processing apparatus 100 includes a central processing unit (CPU) 201, a random access memory (RAM) 202, a read-only memory (ROM) 203, an input apparatus 204, an output apparatus 205, a storage apparatus 206, and a network interface 207 as hardware.

The control unit 101 is a functional unit that includes the CPU 201 and executes processing to read a program or data stored in the ROM 203 onto the RAM 202 and generate a video image.

Figure 4A:
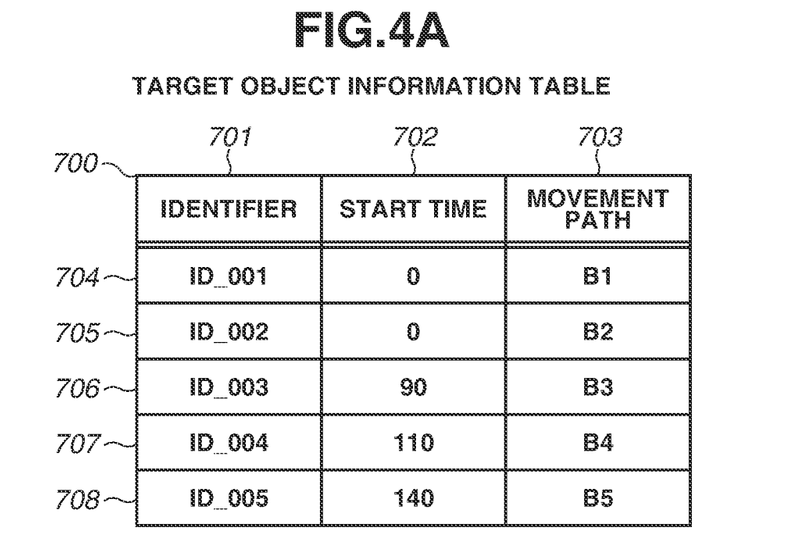
FIG. 4A illustrates a target object information table containing one or more pieces of target object information received by a reception unit.

The reception unit 102 receives a plurality of pieces of target object information as a result of analysis processing on a video image by a user operation performed using the input apparatus 204 including a keyboard and a mouse. An original video image that is an analysis processing target can be a video image stored in the storage apparatus 206 or a video image read from a network 208 via the network interface 207. Further, target object information is information containing data (start time, movement path) about a target object contained in an original video image as illustrated in FIG. 4A described below.

The identification unit 103 performs processing to identify an identical target object based on data about each of a plurality of target objects detected in an original video image. In other words, the identification unit 103 determines the identification of target objects that are specified by a plurality of pieces of target object information received by the reception unit 102 in order to group information about a plurality of target objects determined to be identical.

The arrangement determination unit 104 determines an arrangement of movement paths of two or more target objects determined to be identical by the identification unit 103 so that the movement paths do not overlap in a time direction. Specifically, an arrangement of movement paths of respective target objects in the time direction is determined for each group determined by the identification unit 103 such that the movement paths do not overlap in the time direction.

The generation unit 105 performs processing to generate a summary video image of an original video image based on an arrangement determined by the arrangement determination unit 104. Specifically, a temporal reproduction position in the summary video image is determined for every target object extracted from the original video image, and the summary video image is generated based on the determination results. The generated summary video image is stored in the storage apparatus 206 and reproduced on the output apparatus 205 such as a display.

Figure 2A:
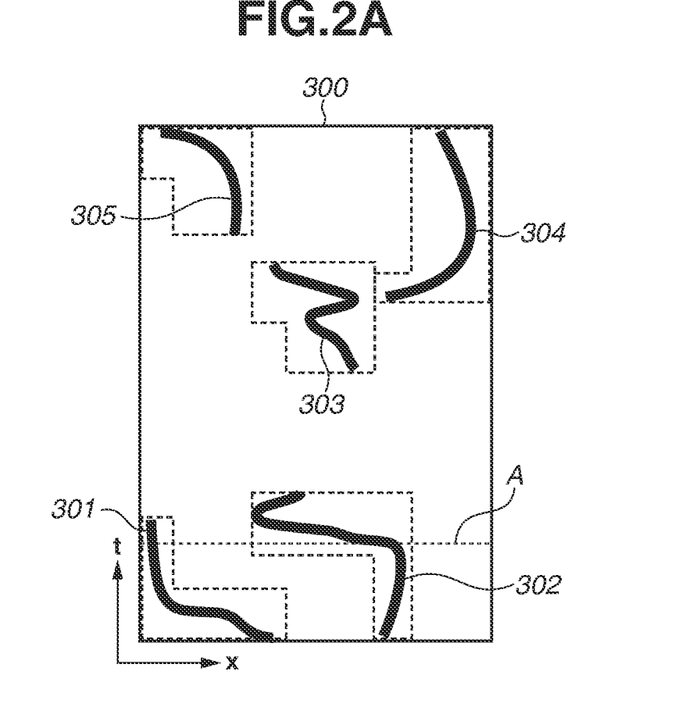
FIG. 2A illustrates an arrangement of movement paths of target objects in a time-space of an original video image.

FIG. 2A illustrates an arrangement 300 of movement paths of target objects in a time-space of an original video image. The horizontal axis represents the space, and the vertical axis represents the time. While a space is generally expressed by two axes, i.e., x and y axes, the y-axis values are omitted herein to prioritize ease of understanding an expression, and the space will be described as being one-dimensional with the x-axis alone. As to time t, the bottom of FIG. 2A is a recording start time and the top of FIG. 2A is a recording end time. In FIG. 2A, movement paths 301 to 305 specified by thick lines each represent a path of a center of a target object that appears in the video image. Further, dotted lines (frames) around the movement paths 301 to 305 each represents a target object range.

The information processing apparatus 100 defines a target object based on a set of pixels that appear in respective consecutive frames. Further, the information processing apparatus 100 defines a target object range of a target object based on the radius of a circle centered at the center of the target object. The center of a target object refers to the center position of a pixel set of the target object. Further, a radius that specifies a target object range of a target object is calculated based on the area of a pixel set of the target object. Details of a method for the calculation will be described below.

Further, the movement paths 302 and 304 in FIG. 2A will be described below as movement paths of the same person. Similarly, the movement paths 303 and 305 in FIG. 2A will be described below as movement paths of the same person.

Figure 2B:
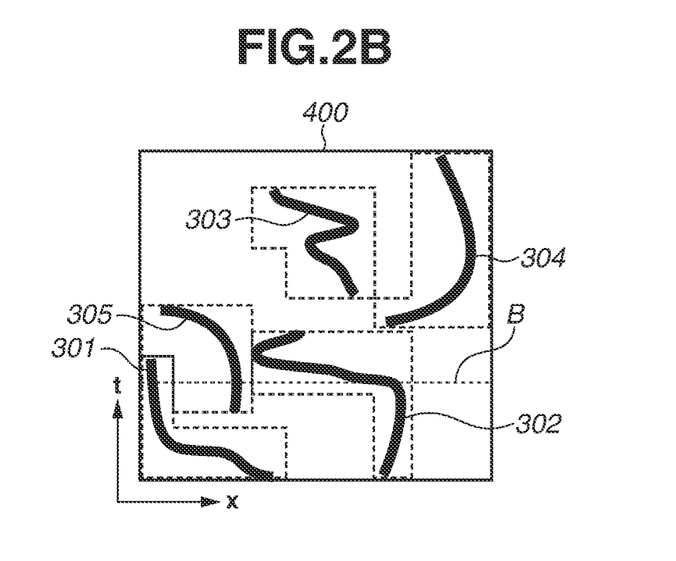
FIG. 2B illustrates an arrangement of the movement paths of the target objects in a time-space of a summary video image.

FIG. 2B illustrates an arrangement 400 of movement paths of target objects in a time-space of a summary video image. Specifically, a video image summary generated by changing a temporal order of appearance of target objects from that in an original video image while maintaining the spatial positions of the target objects is illustrated. Especially, FIG. 2B illustrates a state as a result of processing by the information processing apparatus 100 according to the present exemplary embodiment so that a plurality of video images corresponding to the same person does not appear at the same timing in a video image.

Among the movement paths 301 to 305 of the target objects in FIG. 2B, the movement paths 303 to 305 are respectively generated by shifting the start times of the movement paths 303 to 305 in FIG. 2A. Arranging the movement paths 301 to 305 as illustrated in FIG. 2B prevents the plurality of video images corresponding to the same person (the movement paths 302 and 304, the movement paths 303 and 305) from appearing at the same timing in the video image.

Figure 3A:
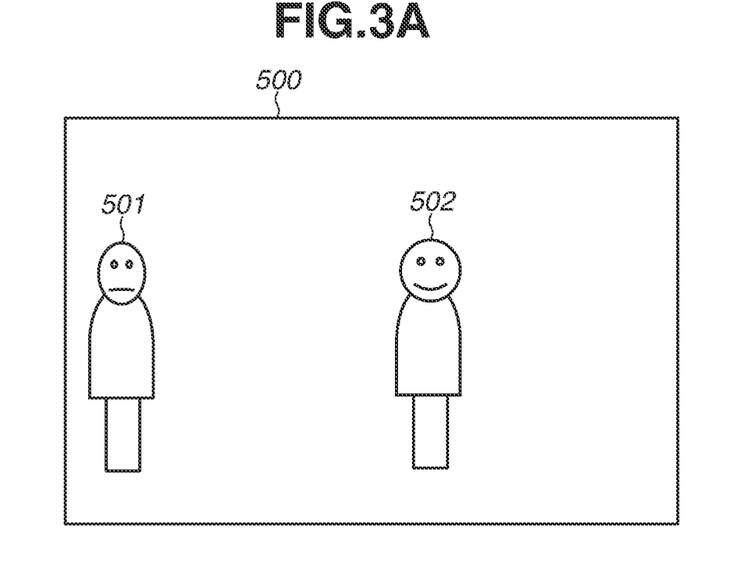
FIG. 3A illustrates a frame of an original video image that is received by a control unit.

FIG. 3A illustrates a frame 500 of an original video image received by the control unit 101. The frame 500 is a time frame specified by a broken line A in FIG. 2A. A person 501 corresponds to the movement path 301, and a person 502 corresponds to the movement path 302.

Figure 3B:
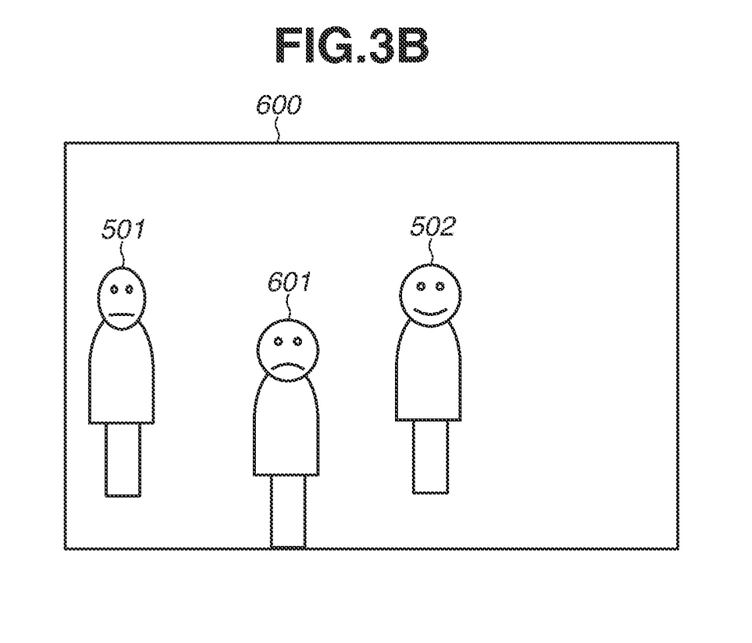
FIG. 3B illustrates a frame of a summary video image that is output by a generation unit.

FIG. 3B illustrates a frame 600 of a summary video image output by the generation unit 105. The frame 600 is a time frame specified by a broken line B in FIG. 2B. A person 601 corresponds to the movement path 305.

From FIGS. 3A and 3B, it is understood that the person 601 who is recorded at a different time and is not the same person appears in the video image besides the persons 501 and 502 as a result of summarization processing.

FIG. 4A illustrates a target object information table 700 containing one or more pieces of target object information 704 to 708 received by the reception unit 102. The pieces of target object information 704 to 708 are information in an original video image and respectively correspond to the movement paths 301 to 305 in FIG. 2A.

As illustrated in FIG. 4A, the pieces of target object information 704 to 708 each contain an identifier 701, a start time 702, and a movement path 703. The identifier 701 is information for uniquely identifying target object information. The start time 702 is a timing of appearance of a target object in an original video image, and the timing is specified as the length of time from an image capturing start time of the original video image. The movement path 703 will be described below with reference to FIG. 4B.

Figure 4B:
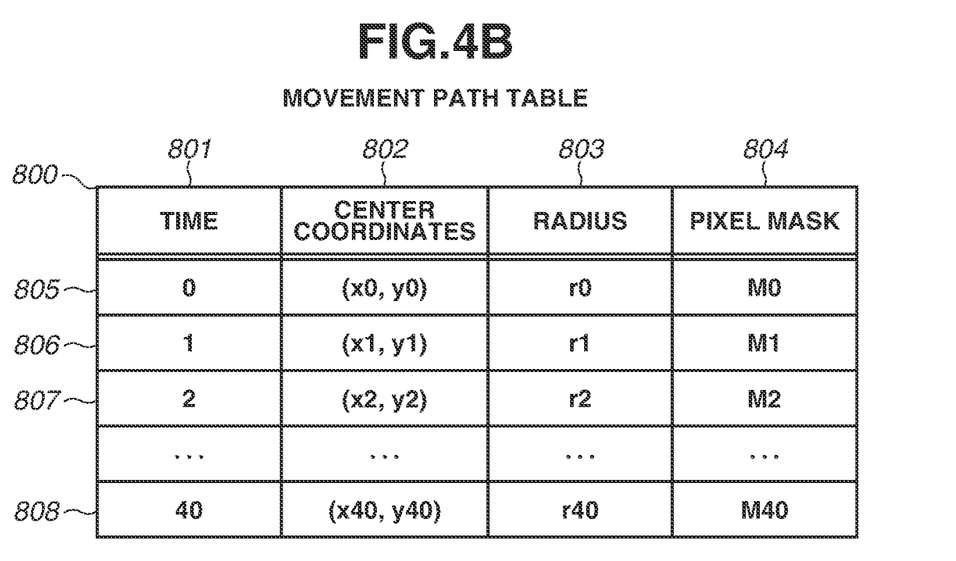
FIG. 4B illustrates a movement path table containing a series of records of movement paths.

FIG. 4B illustrates a movement path table 800 containing a series of records 805 to 808 of the movement path 703 of a target object. B1 to B5 specified in the movement path 703 of the target object are associated with the movement path table 800 as illustrated in FIG. 4B.

The records 805 to 808 are each information generated correspondingly to a single frame of the original video image and constitute time-series data. As illustrated in FIG. 4B, the records 805 to 808 each contain a time 801, center coordinates 802, a radius 803, and a pixel mask 804.

The time 801 specifies the time of the frame corresponding to the record in the original video image. The time 801 is expressed as the length of time from the time (the start time 702 in FIG. 4A) of appearance of the corresponding target object in the original video image. The center coordinates 802 specify the center position of the pixel set of the target object in each frame. An average of coordinates of all the pixels of the target object is used as the center position. The radius 803 specifies a target object range of the target object. The radius 803 is calculated by calculating the square root of S/π, where S is the total number of pixels of the target object. While each target object range is expressed as a form approximated to a circle in the present exemplary embodiment, any form that can specify a range can be employed. The pixel mask 804 specifies a link to mask information that specifies the detailed pixel positions of the target object in the frame. While the pixel mask 804 is an image with information that discriminates the target object from the others in the present exemplary embodiment, the pixel mask 804 can be in any form other than an image that can discriminate the target object from the others.

Figure 5:
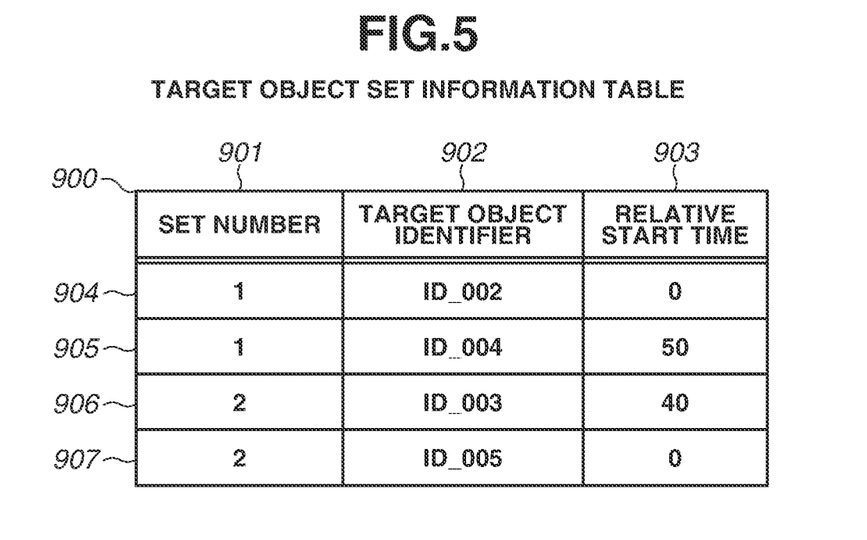
FIG. 5 illustrates a set information table containing target object set information generated by an arrangement determination unit based on a determination result by an identification unit.

Next, FIG. 5 is a set information table 900 containing target object set information 904 to 907 generated by the arrangement determination unit 104 based on determination results by the identification unit 103. As illustrated in FIG. 5, the pieces of set information 904 to 907 each contain a set number 901, a target object identifier 902, and a relative start time 903.

The set number 901 is information for uniquely identifying group of information about a target object identified as the identical target object by the identification unit 103. The arrangement determination unit 104 assigns the set number 901 to each group. The target object identifier 902 corresponds to the identifier 701 in FIG. 4A. Among the five identifiers 701 in FIG. 4A, an identifier ID_001 is not in FIG. 5 because the target object identified by the identifier ID_001 is not grouped. As described above, target object information that is not grouped due to the absence of the identical target object information is not included in the set information table 900. The relative start time 903 is the relative start time of appearance of each of the plurality of target objects of the same group in the summary video image.

Figure 6:
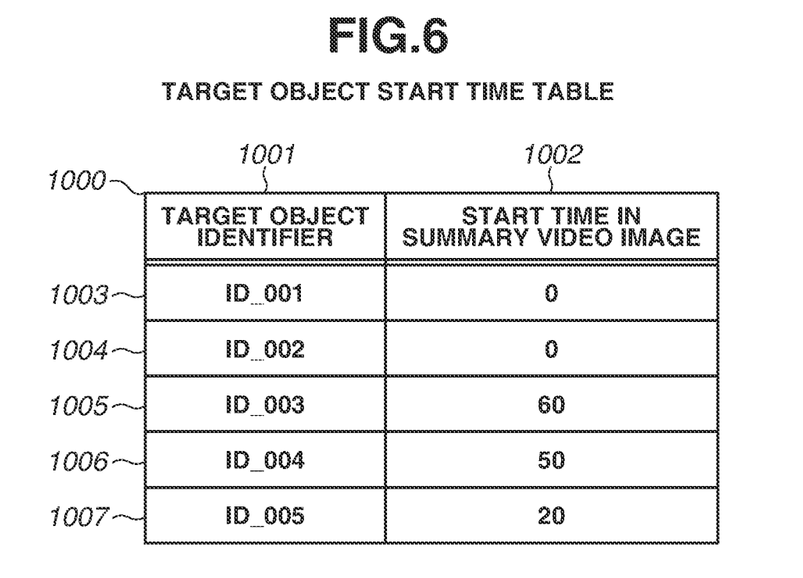
FIG. 6 illustrates a start-time table containing start time information about each target object in a summary video image.

FIG. 6 illustrates a start-time table 1000 containing start time information 1003 to 1007 about the respective target objects in the summary video image. The information specified in FIG. 6 is generated by the generation unit 105 based on the target object information specified in FIGS. 4A and 4B and the set information specified in FIG. 5.

As illustrated in FIG. 6, the pieces of start time information 1003 to 1007 each contain a target object identifier 1001 and a start time 1002 in the summary video image. The target object identifier 1001 corresponds to the identifier 701 in FIG. 4A. The start time 1002 in the summary video image specifies a target object reproduction start time in the summary video image.

Next, a method of generating an arrangement of the target objects in the summary video image in FIG. 2B will be described below with reference to a flowchart in FIG. 7. The process in the flowchart is executed by the CPU 201 based on a control program stored in the ROM 203 and read to the RAM 202, A case where the original video image in FIG. 2A is input will be described below as an example.

Figure 7:
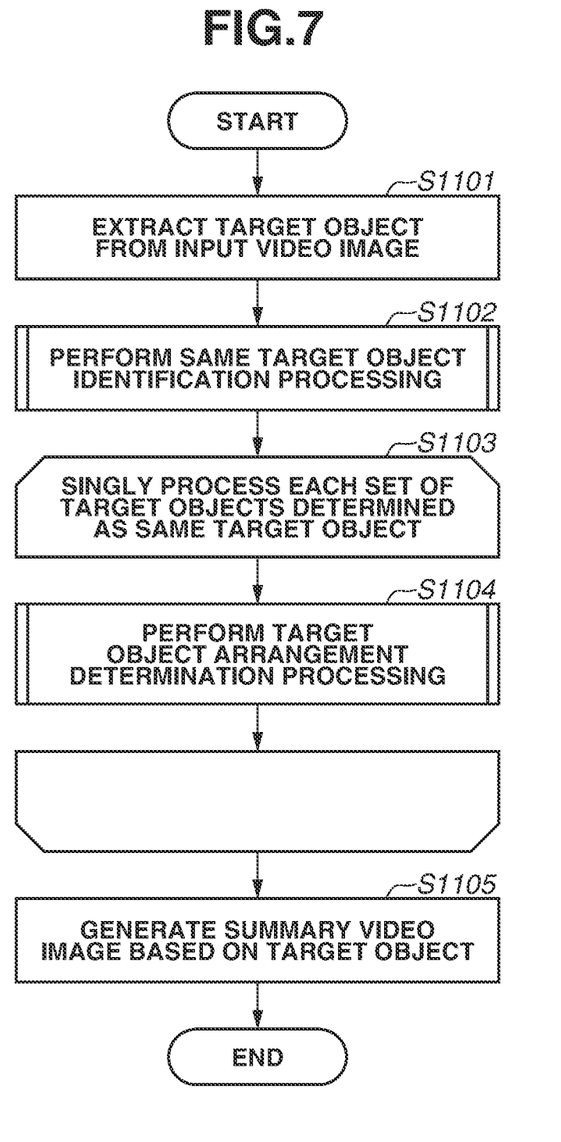
FIG. 7 is a flowchart illustrating an example of a process performed by the control unit according to an exemplary embodiment of the present disclosure.

FIG. 7 is a flowchart illustrating an example of a process that is executed by the control unit 101 in the present exemplary embodiment. The process in the flowchart is started when the information processing apparatus 100 reads a video image recorded by a monitoring camera.

In step S1101, the control unit 101 acquires target object information extracted from the recorded video image from the reception unit 102, and the processing proceeds to step S1102. Among various methods for extracting a foreground target image such as a moving object from a recorded video image, a method discussed in J. Sun, W. Zhang, X. Tang, and H. Shum. Background cut. ECCV' 06, pp. 628-641, 2006 is used in the present exemplary embodiment. Any other methods for extracting a foreground target object from a video image can also be used.

The extracted target object information contains the target object information illustrated in FIG. 4A and the movement path illustrated in FIG. 4B. As illustrated in 4A, the identifier 701 is assigned to the extracted target object information. Further, the target object information contains the start time 702 specifying the time of appearance of the target object in the recorded video image and the movement path 703 including the relative time 801 of the target object, the center coordinates 802, the radius 803, and the pixel mask 804. The movement paths B1 to B5 of the identifiers ID_001, ID_002, ID_003, ID_004, and ID_005 in FIG. 4A respectively correspond to the movement paths 301, 302, 303, 304, and 305 in FIG. 2A.

In step S1102, the control unit 101 controls the identification unit 103 to perform the same target object identification processing described below, and the processing proceeds to step S1103, in step S1102, the control unit 101 also controls the identification unit 103 to group the target objects determined as the identical target object as a set. In the present exemplary embodiment, as illustrated in FIG. 5, the movement paths 302 and 304 are determined as the identical target object, and the movement paths 303 and 305 are determined as the identical target object.

In step S1103, the control unit 101 controls the arrangement determination unit 104 to perform step S1104 on every set of target objects determined as the identical target object. Then, if all the sets are processed, the processing proceeds to step S1105 Step S1104 is the target object arrangement determination processing described below.

In step S1105, the generation unit 105 generates a summary video image based on the target object information in the target object information table 700, the movement path in the movement path table 800, and the target object set information in the set information table 900. Specifically, the generation unit 105 first temporally combines the movement paths of the target objects having the same set number 901 into a single movement path. Specifically, the start time of appearance of each target object is shifted by the relative start time so that the plurality of movement paths do not overlap. Then, the generation unit 105 calculates the start time of each movement path in the summary video image so that the number of collisions between the movement paths is minimized and the reproduction time is minimized.

A collision between movement paths of target objects will be described below. The generation unit 105 calculates a collision cost $Col_{ij}(k)$ between target objects i and j using formula (1) below. In formula (1), k is the time difference in start time between the target objects i and j, $x_t^i$ and $y_t^i$ are respectively the x- and y-coordinates of the center of the target object i at time t, and $r_t^j$ is the radius of the target object i at time t. Further, $T_{ij}(k)$ is the length of time during which the movement paths of the target objects i and j both appear in the video image, where k is the time difference in start time. Further, the formula in the absolute value signs of the right side of formula (1) has a relatively large value indicating a collision in a case where the distance between the centers of the target objects i and j is less than the sum of the radiuses, whereas in a case where the distance is not less than the sum of the radiuses, the formula has a relatively small value indicating no collision. Thus, a greater value of the collision cost $Col_{ij}(k)$ indicates a greater number of frames in which the target objects i and j collide.

$$Col_{ij}(k) = \sum_{t \in T_{ij}(k)} |(x_t^i - x_{t+k}^j)^2 + (y_t^i - y_{t+k}^j)^2 < (r_t^i) + (r_{t+k}^j)^2| \quad (1)$$

The generation unit 105 calculates the start time to minimize the collision cost $Col_{ij}(k)$ in every combination of target objects using simulated annealing. With the simulated annealing, a non-linear problem with a range constraint is efficiently calculated. Thus, the generation unit 105 calculates the start time of each target object using simulated annealing to calculate the optimum start time 1002 (refer to FIG. 6) of the target object in the summary video image. The generation unit 105 generates a summary video image by changing an appearance start order while maintaining the spatial positions of the target objects in the original video image as described above. Specifically, a summary video image is generated by attaching each target object image cut from the original video image using the pixel mask 804 onto a background image based on the calculated start time.

Figure 8A:
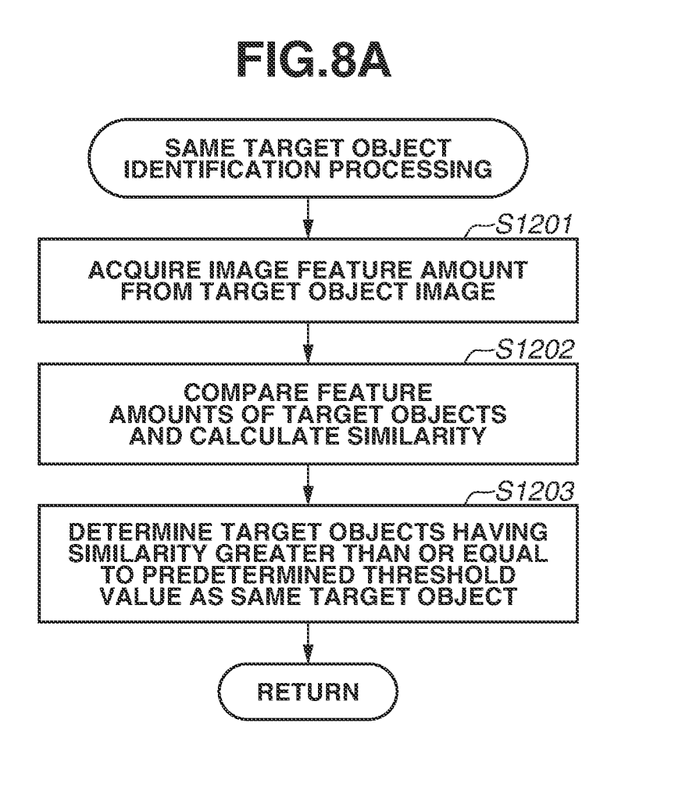
FIG. 8A illustrates an example of the identical target object identification processing in FIG. 7.

FIG. 8A illustrates an example of the identical target object identification processing in step S1102 in FIG. 7. In step S1201, the identification unit 103 acquires an image feature amount from the target object image information, and the processing proceeds to step S1202. As to the target object image, a target object image with the greatest number of pixels among the target object images in each frame is selected. As to the image feature amount, a scale invariant feature transform (SIFT) feature amount of the selected target object image is used. More specifically, the identification unit 103 selects a row having the greatest value of the radius 803 from the rows of the movement path table 800 illustrated in FIG. 4B for each target object and applies the pixel mask 804 to the frame of the original video image that corresponds to the selected row. In this way, only the image of the target object is cropped, and the SIFT feature amount of the cropped target object image is calculated. While a method for acquiring information for comparing target objects by calculating the SIFT feature amount of the target object image with the greatest number of pixels is employed in the present exemplary embodiment, any method for acquiring information for comparing target objects can be employed.

In step S1202 the identification unit 103 calculates similarity between the target objects by comparing the feature amounts of the target objects, and the processing proceeds to step S1203. Specifically, the SIFT feature amount of each target object is compared with every other SIFT feature amount to calculate the similarities between the target objects.

In step S1203, the identification unit 103 determines two target objects as the identical target object if the value of the similarity of the two target objects that is calculated in step S1202 is greater than or equal to a predetermined threshold value. For example, in a case where the similarity value range is 0 to 1000 and the threshold value is 800, two target objects are determined as the identical target object if the similarity between the two target objects is greater than or equal to 800, whereas two target objects are determined as not the identical target object if the similarity between the two target objects is less than 800. FIG. 5 illustrates a case where the respective target objects corresponding to the identifiers ID_002 and ID_004 are determined as the identical target object and the respective target objects corresponding to the identifiers ID_003 and ID_005 are determined as the identical target object as a result of the above-described similarity determination. The determination result of the identification unit 103 is returned to the control unit 101 and stored in the set information table 900 illustrated in FIG. 5.

Figure 8B:
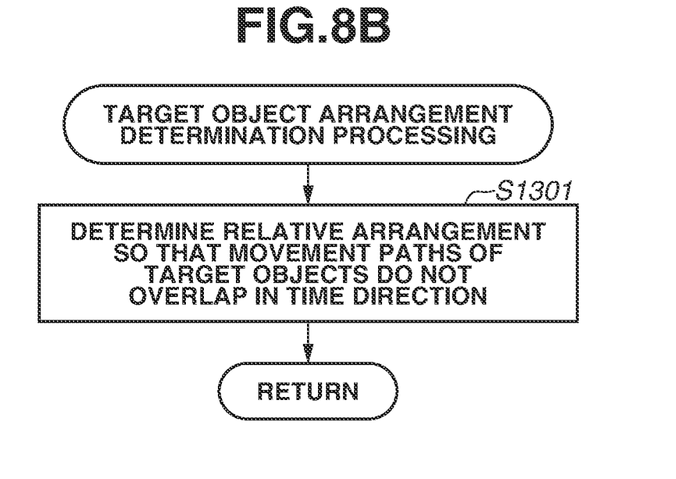
FIG. 8B illustrates an example of the target object arrangement determination processing in FIG. 7.

FIG. 8B illustrates an example of the target object arrangement determination processing performed in step S1104 in FIG. 7. In step S1301, the arrangement determination unit 104 determines a temporal arrangement of the plurality of target objects determined as the identical target object so that the movement paths of the target objects do not overlap in the time direction. In the present exemplary embodiment, the target objects are simply combined so that the movement paths of the target objects are reproduced in turn. More desirably, the target objects are combined so that the movement paths of the target objects are reproduced in turn in series A case where an execution time of the movement path of the target object corresponding to the identifier ID_002 is 50 and an execution time of the movement path of the target object corresponding to the identifier ID_004 is 60 and the latter target object is reproduced after the former target object will be described below. In this case, the arrangement determination unit 104 assigns 0 to the relative start time of the former target object and 50 to the relative start time of the latter target object, whereby the movement path of the target object corresponding to the identifier ID_004 is continuously reproduced following the movement path of the target object corresponding to the identifier ID_002.

As described above, the information processing apparatus 100 according to the present exemplary embodiment prevents the same person from appearing at a plurality of positions in the same frame of a summary video image while the advantage of a summary video image that a recorded video image can be checked in a short time is retained. This reduces the possibility of a failure to detect an action of a person of interest.

FIRST MODIFIED EXAMPLE OF PRESENT EXEMPLARY EMBODIMENT

While the case where every target object is not displayed with the identical target object at the same time in a summary video image is described in the present exemplary embodiment, this case is a mere example of an implementation that realizes the present exemplary embodiment. A case where only a selected target object is not displayed with the identical target object at the same time in a summary video image will be described below as a modified example.

Figure 9:
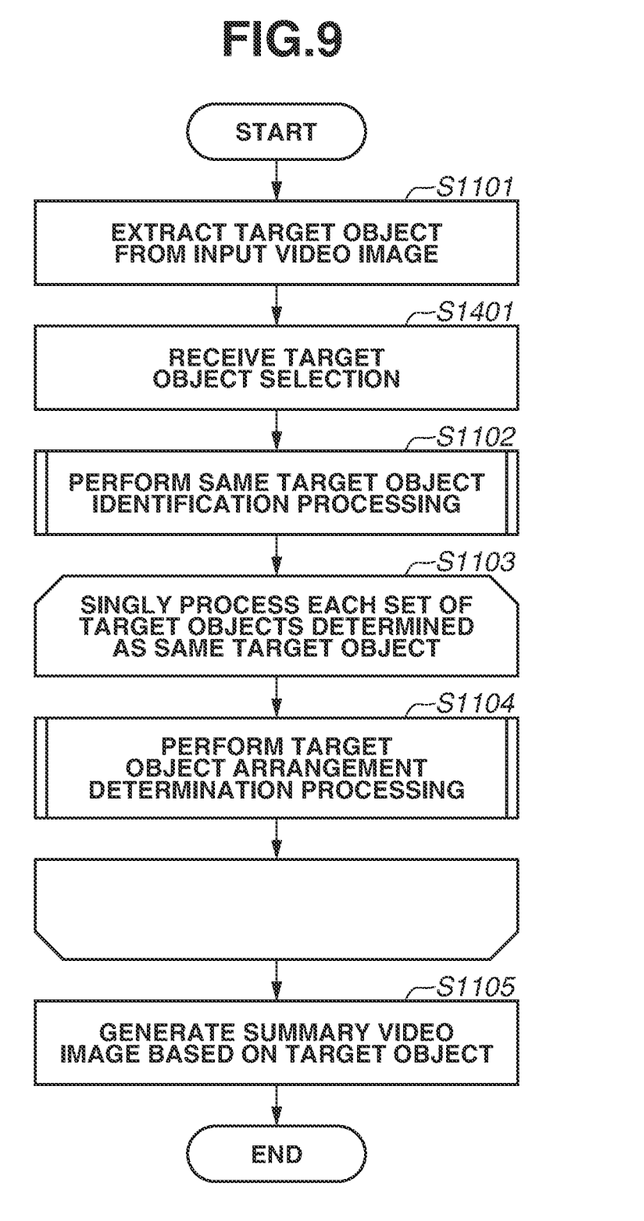
FIG. 9 is a flowchart illustrating an example of a process performed by the control unit according to a first modified example of an exemplary embodiment of the present disclosure.

FIG. 9 is a flowchart illustrating an example of a process performed by the control unit 101 in the present modified example. The process illustrated in the flowchart is started if the information processing apparatus 100 reads a video image recorded by a monitoring camera.

Steps S1101, S1102, S1103, S1104, and S1105 in FIG. 9 are similar to those in FIG. 7, so that descriptions thereof are omitted. In step S1401 after step S1101, the control unit 101 receives target object selection from the input apparatus 204 in FIG. 1B, and the processing proceeds to step S1102. In step S1401, the control unit 101 displays thumbnail images of target images extracted from the original video image on a display of the output apparatus 205 so that the thumbnail images are selectable with the input apparatus 204 such as a mouse. A user selects one or more target objects by selecting one or more thumbnail images using the input apparatus 204. While a target object is selected by selecting a thumbnail image in the present modified example, a method of selecting a target object in an original video image can be employed, and any method for selecting a target object can be employed. In step S1102, the identical target object identification processing is performed only on the selected target object.

Figure 10:
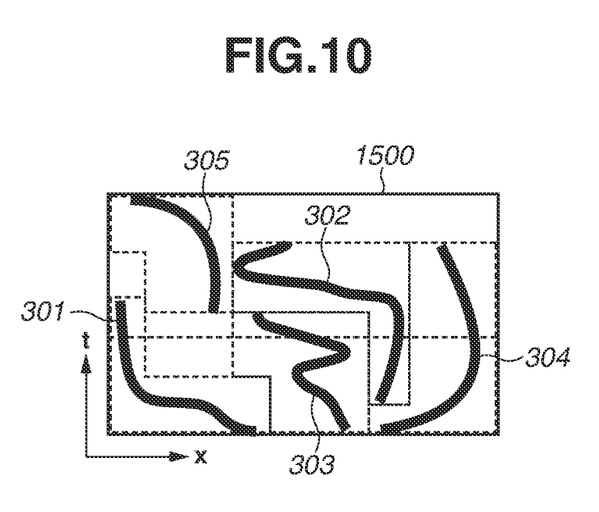
FIG. 10 illustrates an arrangement of movement paths of target objects in a summary video image according to a first modified example of an exemplary embodiment of the present disclosure.

FIG. 10 illustrates an arrangement 1500 of the movement paths 302 to 305 of the target objects in a summary video image according to the present modified example. The movement paths 302 to 305 in FIG. 10 are the movement paths 302 to 305 in FIG. 2A that are shifted in temporal arrangement. Specifically, the temporal appearance order of the target objects is changed from that in the original video image. FIG. 10 illustrates a case where the target object corresponding to the identifier ID_003 (the movement path 303) is selected. A target object that is the same as the target object corresponding to the identifier ID_003 is the target object corresponding to the identifier ID_005 (the movement path 305). Thus, only the movement paths 303 and 305 are arranged to not overlap in the time direction while the other movement paths 301, 302, and 304 are arranged to allow an overlap in the present modified example as illustrated in FIG. 10. The movement paths 302 and 304 are movement paths of the identical target object, and in FIG. 10, the movement paths 302 and 304 are arranged to overlap in the time direction, and the plurality of target objects that is the identical target object is displayed in the same frame during a period.

As described above, with the information processing apparatus 100 according to the present modified example, a user can designate a person to prevent the person from appearing at a plurality of positions in the same frame of a summary video image, so that the possibility of a failure to detect an action of a person of interest is further reduced.

SECOND MODIFIED EXAMPLE OF PRESENT EXEMPLARY EMBODIMENT

In a second modified example, a use case where target object selection is received at the time of reproduction of a summary video image generated by the generation unit 105 in FIG. 1A and an original video image of the selected target object is reproduced will be described below.

Figure 11A:
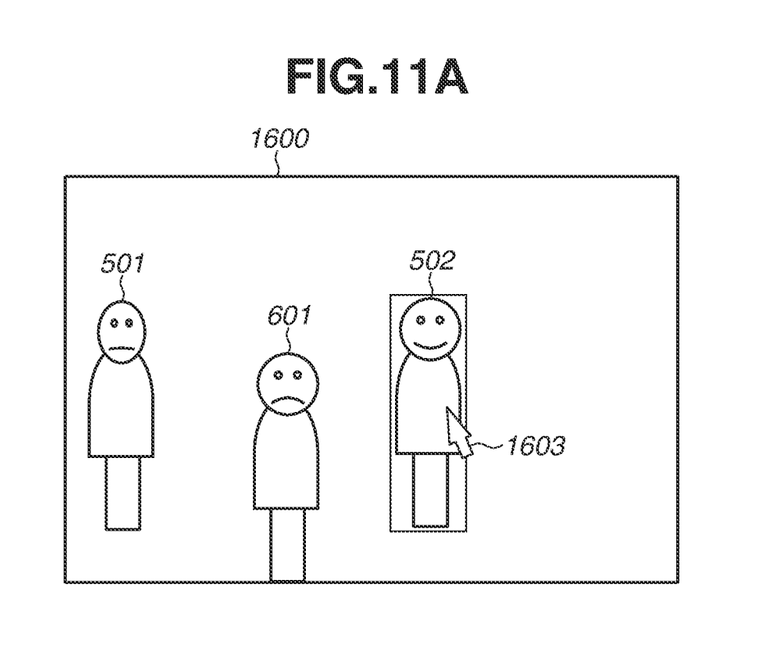
FIG. 11A illustrates a frame of a summary video image reproduced by the control unit.

FIG. 11A illustrates a frame 1600 in a summary video image reproduced by the control unit 101. The frame 1600 is the same as the frame 600 in FIG. 3B and contains the persons 501, 502, and 601. The control unit 101 moves a mouse pointer 1603 in response to an input from a mouse of the input apparatus 204 and receives target object selection during summary video image reproduction. FIG. 11A illustrates a state where the person 502 is selected.

Figure 11B:
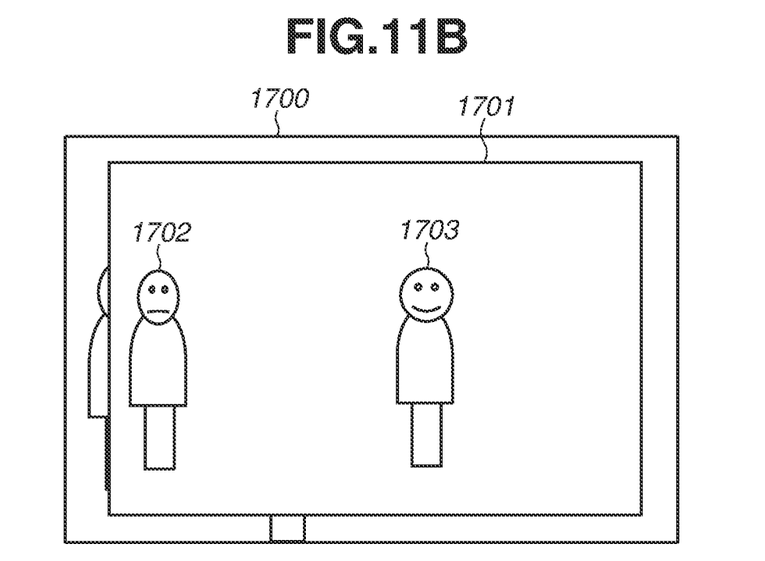
FIG. 11B illustrates a frame displayed after a person is selected from the frame.

FIG. 11B illustrates a frame 1700 displayed after the person 502 is selected in the frame 1600. If the control unit 101 receives target object selection during summary video image reproduction, the control unit 101 reproduces an original recorded video image 1701 of the selected target object as a popup display. From the popup display, a user can check a state in which the person 502 is originally recorded. The recorded video image 1701 is the same as, for example, the frame 600 in FIG. 3A (an overall size is slightly reduced).

Figure 12:
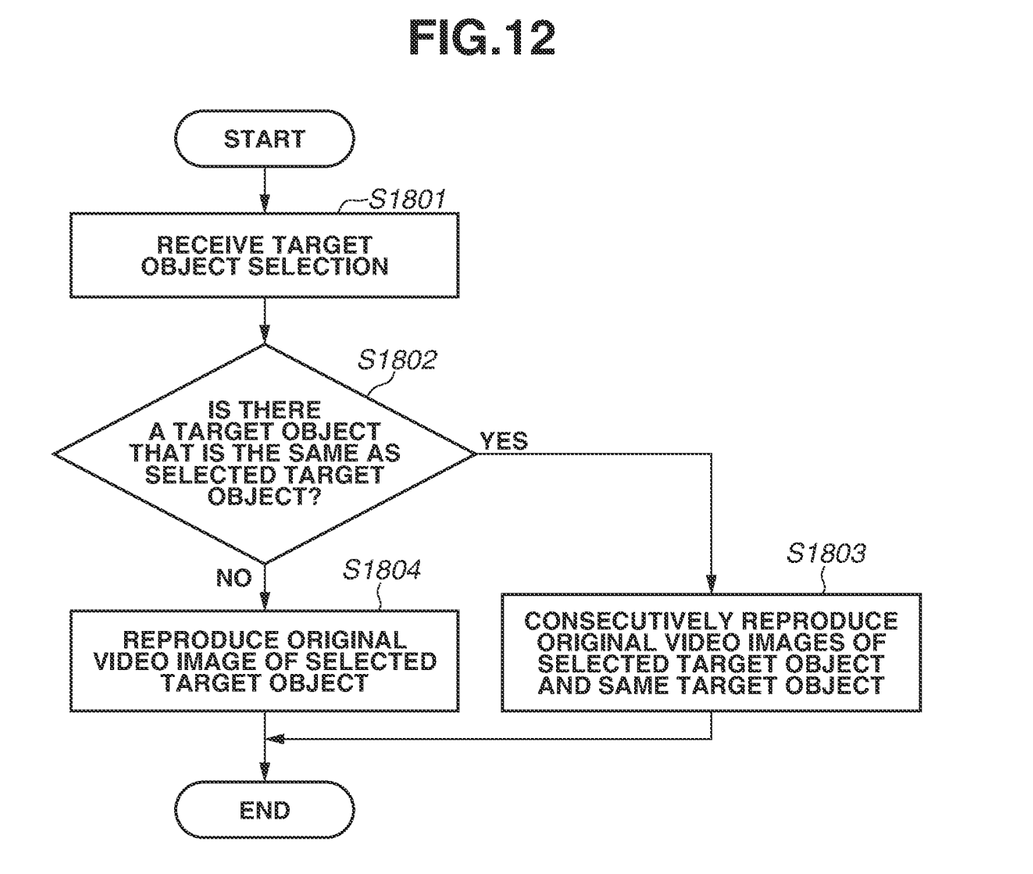
FIG. 12 is a flowchart illustrating an example of a process performed by the control unit according to a second modified example of an exemplary embodiment of the present disclosure.

FIG. 12 is a flowchart illustrating an example of a process performed by the control unit 101 according to the present modified example. The process in the flowchart is started if a user selects a target object via the input apparatus 204 while the information processing apparatus 100 reproduces a summary video image.

In step S1801, the control unit 101 receives target object selection based on an input from the input apparatus 204, and the processing proceeds to step S1802, in step S1802, the control unit 101 determines whether there is a target object identical to the selected target object based on the target object set information table 900 illustrated in FIG. 5. In a case where there is a target object identical to the selected target object (YES in step S1802), the processing proceeds to step S1803. On the other hand, in a case where there is no target object identical to the selected target object (NO in step S1802), the processing proceeds to step S1804.

In step S1803, the control unit 101 continuously reproduces the original video image of the selected target object (hereinafter, "part of the original video image containing the selected target object") and the remaining part of the original video image containing a target object identical to the selected target object. For example, in a case where the target object corresponding to the identifier ID_002 is selected, there is the target object corresponding to the identifier ID_004 as the identical target object. Thus, the control unit 101 continuously reproduces the original video image of the target object corresponding to the identifier ID_002 and the original video image of the target object corresponding to the identifier ID_004. In step S1804, on the other hand, the control unit 101 reproduces only the original video image of the selected target object. For example, in a case where the target object corresponding to the identifier ID_001 is selected, since there is not a target object that is the identical target object, only the original video image of the target object corresponding to the identifier ID_001 is reproduced. As described above, the information processing apparatus 100 according to the present modified example continuously reproduces original video images of the identical target object when selecting target objects from a summary video image and reproducing original video images of the selected target objects. This makes it easy to check and track a person of interest in an original video image.

THIRD MODIFIED EXAMPLE OF PRESENT EXEMPLARY EMBODIMENT

In the first exemplary embodiment, a summary video image is generated by simply combining movement paths of the same person in a video image. This is a mere example of an implementation that realizes the first exemplary embodiment. A case where movement paths of the same person have a disconnected portion and a path in the disconnected portion is interpolated in combining the movement paths will be described below as a third modified example.

An example of a process performed by the control unit 101 according to the present modified example will be described below with reference to the flowchart in FIG. 7 described above in the first exemplary embodiment. Steps S1101, S1102, S1103, and S1104 are similar to those in the first exemplary embodiment, so that descriptions thereof are omitted. In step S1105, as in the first exemplary embodiment, the generation unit 105 generates a summary video image. When movement paths of target objects having the same set information are combined into a single movement path during the summary video image generation, if the movement paths have a disconnected portion, the disconnected portion is interpolated, in a case where the positions of the identical target object are not continuous between the movement paths of the target object, a movement path is generated such that the last position of a movement path is connected with the first position of the subsequent movement path. A movement path can be generated by drawing a path that linearly moves at constant speed or by drawing a path based on the speeds and orientations of a movement path and the subsequent movement path. As to a target object image to be displayed along the generated movement path, the last image of the previous movement path can be used, or morphed images of a movement path and the subsequent movement path can be used. In any cases, a movement path and the subsequent movement paths are interpolated to be continuous.

As described above, the possibility of a failure to detect an action of a person of interest is reduced by preventing the same person from appearing at the same time in a plurality of summary video images while the advantage of a video image summary that a recorded video image is changed to a video image with the minimum possible length is retained. Furthermore, the movement paths of the same person are combined into a single movement path so that even if the movement paths of the person have a disconnected portion, the position of the person is smoothly tracked with the eyes due to an interpolated path. Thus, oversights are further reduced.

Other Exemplary Embodiments

The target objects for the identification determination according to the present exemplary embodiment are not limited to persons. For example, an object such as a car, bicycle, airplane, or boat or an animal such as a dog, cat, or horse can be a target object for the identification determination.

Further, in a case where there is an interval between movement paths of two or more target objects determined as the identical target object, the arrangement determination unit 104 can interpolate the interval. Specifically, a video image to interpolate the interval can be generated and added to a summary video image.

The present disclosure is also realized by a program that realizes part or one or more functions of the above-described exemplary embodiments. Specifically, the present disclosure is realized by a process in which the program is supplied to a system or apparatus via a network or storage medium and one or more processors of a computer (or CPU or microprocessing unit (MPU)) of the system or apparatus read and execute the program. Further, the program can be recorded in a computer-readable recording medium and provided.

Further, the present disclosure is not limited to one that realize functions of the exemplary embodiments by executing a program read by a computer. For example, an operating system (OS) running on a computer can perform part of or entire processing based on an instruction from the program so that functions of the above-described exemplary embodiments are realized by the processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-184778, filed Oct. 7, 2019, which is hereby incorporated by reference herein in its entirety.

What is claimed is:

1. An information processing apparatus to generate a summary video image by changing an appearance order of a target object detected from a video image, the information processing apparatus comprising:
    a processor; and
    a memory storing executable instructions which, when executed by the processor, cause the information processing apparatus to perform operations including:
    obtaining a plurality of pieces of target object information each including an identifier for uniquely identifying a target object and movement path information indicating a position and time at which the target objection has appeared in the video image;
    generating group information indicating a combination of pieces of target object information identified, among the plurality of pieces of target object information, to indicate a same target object based on the plurality of pieces of target object information, wherein a similarity between feature quantities of target objects extracted based on the respective of the plurality of pieces of target object information is not less than a prescribed value for the pieces of target object information indicated by the group information;
    determining, based on the group information, an arrangement of pieces of the moving path information contained in pieces of target object information indicated by the group information so as not to overlap each other in a time direction; and
    generating a summary video image including the pieces of the movement path information of the same target object based on the arrangement.

2. The information processing apparatus according to claim 1, wherein the arrangement is determined so that a plurality of movement paths of the identical target object are reproduced in turn.

3. The information processing apparatus according to claim 1, wherein the arrangement is determined so that a plurality of movement paths of the identical target object are reproduced in turn in series.

4. The information processing apparatus according to claim 1, wherein executing the executable instructions causes the information processing apparatus to perform further operations including: receiving selection of one or more target objects detected from the video image,
    wherein in a case where the selection of the one or more target objects is received, the identical target object is identified only with respect to the one or more selected target objects.

5. The information processing apparatus according to claim 1, wherein in a case where there is an interval between the movement path information for the same object, the interval is interpolated.

6. The information processing apparatus according to claim 1, wherein executing the executable instructions causes the information processing apparatus to perform further operations including:
    selecting a target object during reproduction of the summary video image; and
    reproducing a portion of the video image that contains the selected target object.

7. The information processing apparatus according to claim 6, wherein a portion of the video image containing the selected target object and another portion of the video image containing the identical target object identical to the selected target object are reproduced continuously.

8. The information processing apparatus according to claim 1, wherein a similarity of an object indicated by the pieces of target object information indicated by the group information to a feature amount of an object indicated by another target object information indicated by the group information of is equal to or more than a prescribed value.

9. A video image summarization method for generating a summary video image by changing an appearance order of a target object detected from a video image, the method comprising:
    obtaining a plurality of pieces of target object information each including an identifier for uniquely identifying a target object and movement path information indicating a position and time at which the target objection has appeared in the video image;
    generating group information indicating a combination of pieces of target object information identified, among the plurality of pieces of target object information, to indicate a same target object based on the plurality of pieces of target object information, wherein a similarity between feature quantities of target objects extracted based on the respective of the plurality of pieces of target object information is not less than a prescribed value for the pieces of target object information indicated by the group information;
    determining, based on the group information, an arrangement of pieces of the moving path information contained in pieces of target object information indicated by the group information so as not to overlap each other in a time direction; and
    generating a summary video image including the pieces of the movement path information of the same target object based on the determined arrangement.

10. A non-transitory computer-readable program storage medium storing a program that causes a computer to function as a unit of the information processing apparatus according to claim 1.

* * * * *